(12) United States Patent
Gutlapalli et al.

(10) Patent No.: US 7,979,474 B2
(45) Date of Patent: Jul. 12, 2011

(54) SEARCH CENTER DYNAMIC CONFIGURATION USING FIELD MAPPINGS

(75) Inventors: Hari K. Gutlapalli, Hercules, CA (US); Shirish K. Kothari, Fremont, CA (US); Suhas R. Mehta, San Jose, CA (US); Wai Pak, Hercules, CA (US)

(73) Assignee: Oracle International Corporation, Redwood Shores, CA (US)

( * ) Notice: Subject to any disclaimer, the term of this patent is extended or adjusted under 35 U.S.C. 154(b) by 352 days.

(21) Appl. No.: 11/875,373

(22) Filed: Oct. 19, 2007

(65) Prior Publication Data

US 2009/0106191 A1 Apr. 23, 2009

(51) Int. Cl.
*G06F 17/30* (2006.01)
(52) U.S. Cl. ......... 707/803; 707/715; 707/741; 707/763
(58) Field of Classification Search ....... 707/2, E17.002, 707/634, 673, 696, 706–708, 711, 713–715, 707/718, 719, 726, 739–746, 749, 755, 756, 707/758, 759, 761, 763, 768, 769, 780, 802, 707/803, 805, 825, 830, 736
See application file for complete search history.

(56) References Cited

U.S. PATENT DOCUMENTS

| | | | |
|---|---|---|---|
| 6,141,659 A | 10/2000 | Barker et al. | |
| 6,192,191 B1 * | 2/2001 | Suga et al. | 386/120 |
| 6,516,337 B1 * | 2/2003 | Tripp et al. | 709/202 |
| 6,654,748 B1 * | 11/2003 | Rabung et al. | 709/203 |
| 6,708,166 B1 * | 3/2004 | Dysart et al. | 707/765 |
| 7,076,728 B2 | 7/2006 | Davis et al. | |
| 7,546,287 B2 | 6/2009 | Subramaniam et al. | |
| 7,567,964 B2 | 7/2009 | Brice et al. | |
| 7,698,282 B2 * | 4/2010 | Subramaniam et al. | 707/715 |
| 7,739,258 B1 * | 6/2010 | Halevy et al. | 707/706 |
| 7,769,770 B2 | 8/2010 | Denuit et al. | |
| 7,801,882 B2 | 9/2010 | Cunningham et al. | |
| 7,885,963 B2 * | 2/2011 | Sanders | 707/750 |
| 2002/0002566 A1 * | 1/2002 | Gajraj | 707/513 |
| 2002/0161757 A1 | 10/2002 | Mock et al. | |
| 2006/0015490 A1 | 1/2006 | Denuit et al. | |
| 2007/0239744 A1 | 10/2007 | Bruno et al. | |
| 2008/0177718 A1 * | 7/2008 | Hasson et al. | 707/4 |

OTHER PUBLICATIONS

Karampiperis P. and Sampson D., (2003), Department of Technology education and digital Systems, University of Piraeus, 150, Androutsou st, Piraeus, GR-18534, Greece, www.ask4research.info/Uploads/Files/Publications/Gr_Pubs/Karampiperis_Sampson_ICALT2003_DRAFT.pdf.*

* cited by examiner

*Primary Examiner* — Srirama Channavajjala
*Assistant Examiner* — Reza Hosseini
(74) *Attorney, Agent, or Firm* — Campbell Stephenson LLP

(57) ABSTRACT

A mechanism for dynamically configuring searchable fields of interest within a search center is provided. A field mappings file is used to define relationships between searchable fields of interest in searchable objects and fields within a search index accessible to an enterprise-wide search center. The field mappings file can provide the defined relationships between searchable object fields and search index fields at runtime of a user session, thus avoiding a rigid configuration at the time of search center initialization.

22 Claims, 8 Drawing Sheets

```
<!DOCTYPE searchable-object [

<!--                                                              -->
<!-- A searchable-object consists of individual SearchCategory,   -->
<!-- LogicalCollection                                            -->
<!--                                                              -->
<!ELEMENT searchable-object (SearchCategory*, LogicalCollection*)>

<!ATTLIST searchable-object
        taxonomy-uri           CDATA                         ""   >

<!ELEMENT SearchCategory (field+, links*)>

<!--                                                                     -->
<!-- bc-name  : Actual name of the Business Component                    -->
<!-- ui-name  : Display name of the Search Category                      -->
<!-- on-name  : Ontological name for the Search Category                 -->
<!-- url      : Bookmark URL template for application                    -->
<!-- parent   : Actual name of the Parent Search Category                -->
<!-- fkey-field: Foreign Key Field name on current Search Category       -->
<!-- weight   : Artificial rank booster for the Search Category          -->
<!-- seqno : Sequence Number for sorting Search Categories on the UI-->
<!--                                                                     -->
<!ATTLIST SearchCategory
        bc-name            CDATA                    #REQUIRED
        ui-name            CDATA                    #REQUIRED
        on-name            CDATA                    #REQUIRED
        url                CDATA                    #REQUIRED
        parent             CDATA                    ""
        fkey-field         CDATA                    ""
        weight             CDATA                    ""
>

<!ELEMENT field EMPTY>

<!--                                                                          -->
<!-- bc-name  : Field Name as it appears in Business Component defn.          -->
<!-- in-name  : Corresponding Index Field bc-name                             -->
<!-- ui-name  : Name String to be used on User Interface                      -->
<!-- on-name  : Field Name for Ontological purposes, used by Engine.          -->
<!-- nv-name  : Field Name for navigators. Not used with current version      -->
<!-- one2many : A place holder for storing the data from the child buscomp    -->
<!-- searchable : Flag identifying if the current field is searchable         -->
<!-- navigable  : Flag identifying if the current field has navigators on it  -->
<!-- calculated : Flag identifying if the current field is calculated using   -->
<!--              other SearchCategory fields                                 -->
<!-- formula    : Calculation formula for the calculated field                -->
<!-- stored     : Flag identifying if the field value is stored on the engine -->
<!-- weight     : Artificial rank booster for the field                       -->
<!-- is-id      : Flag identifying if the current field is a record identifier-->
<!-- id-rank    : If the field is an identifier, how precisely this field can -->
<!--              help retrieve a record                                      -->
<!-- type       : type of data this field contains.                           -->
<!--                                                                          -->
```

Figure 3A

```
<!ATTLIST field
        bc-name         CDATA                           #REQUIRED
        in-name         CDATA                           #REQUIRED
        ui-name         CDATA                           ""
        on-name         CDATA                           ""
        nv-name         CDATA                           ""
        one2many        CDATA                           ""
        searchable      ( Y | N )                       "N"
        navigable       ( Y | N )                       "N"
        calculated      ( Y | N )                       "N"
        formula         CDATA                           ""
        stored          ( Y | N )                       "N"
        weight          CDATA                           ""
        is-id           ( Y | N )                       "N"
        id-rank         CDATA                           ""
        type            ( path | filename | ext | na )  "na"        >

<!--                                                                -->
<!-- LogicalCollection is a collection of one or more SearchCategory -->
<!--                                                                -->
<!ELEMENT LogicalCollection (searchcategory+)>
<!ELEMENT searchcategory (#PCDATA)>

<!--                                                                -->
<!-- links : is a collection of one or more link elements           -->
<!--                                                                -->
<!ELEMENT links (link+)>

<!--                                                                -->
<!-- link  : defines a connection between a field on Source (current) -->
<!--         SearchCategory to that on a Target SearchCategory. Current -->
<!--         SearchCategory is the Source                           -->
<!-- sourceField : Connecting field on the Source SearchCategory    -->
<!-- targetField : Connecting field on the Target SearchCategory    -->
<!-- to-buscomp  : The Target SearchCategory                        -->
<!--                                                                -->
<!ELEMENT link (sourceField, targetField) >

<!ATTLIST link
        to-buscomp      CDATA                           #REQUIRED   >

<!ELEMENT sourceField (#PCDATA)>
<!ELEMENT targetField (#PCDATA)>
```

Figure 3B

```
<!--                                                                    -->
<!-- This file shall have 0..* searchable objects such as business      -->
<!-- components, logical collections, as well as external data source   -->
<!-- defined.                                                           -->
<!--                                                                    -->
<!-- DO NOT assign ui-name to any system fields                         -->
<!--                                                                    -->
<searchable-object taxonomy-uri="">
    <!--                                                                -->
    <!-- This section defines field mappings for all the business       -->
    <!-- components that are searchable.                                -->
    <!--                                                                -->

<!-- (01) Field mapping for Account BC -->
    <SearchCategory bc-name="Account" ui-name="Accounts" on-name="Organization"
url="http://%webserver%/%objmgr%_%lang%/start.swe?SWECmd=GotoView&SWEView=#VIEWNAME#&
amp;SWERF=1&SWEHo=%hostName%&SWEBU=1&SWEApplet0=#APPLETNAME#&SWERowId0=#R
OWID#" parent="" fkey-field="" seqno="1" weight="1">
        <field bc-name="BC Name" in-name="sblbctype" ui-name="" on-name="" nv-name=""
one2many="" is-id="N" id-rank="" type="na"/>
        <field bc-name="Id" in-name="sblrowid" is-id="Y" id-rank="1" ui-name="" on-name=""
nv-name="" one2many="" type="na"/>
        <field bc-name="Created" in-name="createdOn" ui-name="" on-name="" nv-name=""
one2many="" is-id="N" id-rank="" type="na"/>
        <field bc-name="Created By" in-name="createdBy" ui-name="" on-name="" nv-name=""
one2many="" is-id="N" id-rank="" type="na"/>
        <field bc-name="Updated" in-name="lastModifiedDate" ui-name="" on-name="" nv-
name="" one2many="" is-id="N" id-rank="" type="na"/>
        <field bc-name="Updated By" in-name="author" ui-name="" on-name="" nv-name=""
one2many="" is-id="N" id-rank="" type="na"/>
        <field bc-name="Name" in-name="title" is-id="Y" id-rank="2" ui-name="" on-name=""
nv-name="" one2many="" type="na"/>
        <field bc-name="Full Name" in-name="summary" ui-name="Contact Person" on-name=""
nv-name="" one2many="" is-id="N" id-rank="" type="na"/>
        <field bc-name="Mission" in-name="description" ui-name="Account Description" on-
name="" nv-name="" one2many="" is-id="N" id-rank="" type="na"/>
        <field bc-name="Last Name" in-name="lastName" on-name="Last Name" ui-name="" nv-
name="" one2many="" is-id="N" id-rank="" type="na"/>
        <field bc-name="First Name" in-name="firstName" on-name="First Name" ui-name="" nv-
name="" one2many="" is-id="N" id-rank="" type="na"/>
        <field bc-name="Sales Rep" in-name="alias" ui-name="" on-name="" nv-name=""
one2many="" is-id="N" id-rank="" type="na"/>
        <field bc-name="CSN" in-name="csn" ui-name="CSN" on-name="" nv-name="" one2many=""
is-id="N" id-rank="" type="na"/>
        <field bc-name="Type" in-name="type" ui-name="A/C Type" on-name="" nv-name=""
one2many="" is-id="N" id-rank="" type="na"/>
        <field bc-name="Street Address" in-name="street" ui-name="St. Address" on-
name="Street" nv-name="" one2many="" is-id="N" id-rank="" type="na"/>
        <field bc-name="City" in-name="city" ui-name="City" on-name="City" nv-name=""
one2many="" is-id="N" id-rank="" type="na"/>
        <field bc-name="State" in-name="state" ui-name="State" on-name="State" nv-name=""
one2many="" is-id="N" id-rank="" type="na"/>
        <field bc-name="Country" in-name="country" ui-name="Country" on-name="Country" nv-
name="" one2many="" is-id="N" id-rank="" type="na"/>
        <field bc-name="Postal Code" in-name="zipcode" ui-name="Zip Code" on-name="Zipcode"
nv-name="" one2many="" is-id="N" id-rank="" type="na"/>
        <field bc-name="Location" in-name="location" ui-name="" on-name="" nv-name=""
one2many="" is-id="N" id-rank="" type="na"/>
        <field bc-name="Organization Id" in-name="sblvisibilityid" ui-name="" on-name=""
nv-name="" one2many="" is-id="N" id-rank="" type="na"/>
        <field bc-name="Organization" in-name="sblvisibilityinfo" ui-name="" on-name="" nv-
name="" one2many="" is-id="N" id-rank="" type="na"/>
```

Figure 4A

```
    <links>
       <link to-buscomp="Contacts">
          <sourceField>Name</sourceField>
          <targetField>Account</targetField>
       </link>

<link to-buscomp="Campaign Members">
          <sourceField>Name</sourceField>
          <targetField>Account</targetField>
       </link>
    </links>
 </SearchCategory>

<LogicalCollection name="My Favorite Categories" seqno="2">
    <searchcategory>Accounts</searchcategory>
    <searchcategory>Service Request</searchcategory>
    <searchcategory>Contacts</searchcategory>
 </LogicalCollection>

</searchable-object>
```

Figure 4B

SEARCH CENTER DYNAMIC CONFIGURATION USING FIELD MAPPINGS

FIELD OF THE INVENTION

This invention relates to the field of enterprise-wide data searching, and more particularly relates to providing a runtime configurable, enterprise-wide search center.

BACKGROUND OF THE INVENTION

Businesses' ever-increasing reliance on information and the computing systems that produce, process, distribute, and maintain such information in its various forms, puts great demands on techniques for efficiently accessing that information. Business organizations can produce and retain large amounts and varieties of information data. Searching for specific data has become an integral part of many enterprise applications. It is common that such applications have hundreds of searchable objects that represent structured data.

A centralized search center can be used to coordinate searching for desired data among various locations where data may be stored. It is important to optimize a configuration of the search center in order to get precise, relevant, and accurate results for a search.

Various business units within an enterprise can maintain data using a variety of searchable objects. A searchable object may be a representation of a set of one or more joined tables that contain data. A searchable object can have table-like behavior such as an ability to query a set of records within those joined tables. Commonly, the data types within a searchable object are complex. A typical searchable object can include, for example, structures such as a SIEBEL Business Component or an ORACLE FUSION View object.

A typical searchable object can have a large number of data fields, but only a few of those fields may be required for searching. Thus, it is important to configure an enterprise-wide search center to only be concerned with relevant fields of interest contained within the various searchable objects. Reducing the number of available fields for search through such selection of fields of interest, can improve both the utility and the efficiency of the enterprise-wide search center.

In the past, search centers have been configured to provide access to data stored in a limited set of types of searchable objects. Since the types of searchable objects were limited and often of a homogeneous origin with the search center itself, the search engines utilized to search for data in those searchable objects were tightly coupled to the search center architecture. This tight coupling resulted in performing a selection of searchable fields of interest at the design time of the various searchable objects. Any changes to the selection and configuration of fields of interest of searchable objects involved making the enterprise application accessing the enterprise-wide data, including the search center, unavailable to all users, while the enterprise application was shut down and reconfigured with the new set of searchable fields of interest. To avoid such down time, a time-consuming process of initially configuring the search center was necessary due to the need of foreseeing all of the searchable object requirements for a given application. Further, in light of the requirement to shut down the search center in order to deploy configuration changes, any post-deployed changes had a high cost due to the unavailability of the search center.

Therefore, it is desirable to have a mechanism that permits an alteration of searchable fields of interest, either due to changing needs of users or modifications of the searchable objects themselves, without the need for costly downtime of the enterprise application, including the search center.

BRIEF DESCRIPTION OF THE DRAWINGS

The present invention may be better understood, and its numerous objects, features and advantages made apparent to those skilled in the art by referencing the accompanying drawings.

FIGS. 3A and 3B are an example of document type definition file to define structural elements of field mappings files usable by embodiments of the present invention.

FIGS. 4A and 4B are an example of a field mappings file to define relationships between search index fields and searchable object fields usable by embodiments of the present invention.

DETAILED DESCRIPTION

The present invention provides a mechanism for dynamically configuring searchable fields of interest within a search center. Such functionality is provided through the use of a field mappings file that defines relationships between searchable fields of interest in searchable objects and fields within a search index accessible to an enterprise-wide search center. The field mappings file can provide the defined relationships between searchable object fields and search index fields at runtime of a user session, thus avoiding a rigid configuration at the time of search center initialization. Through such runtime modification of a search index, costly downtime due to revision of a configuration of the search center can be avoided.

Figure 1:
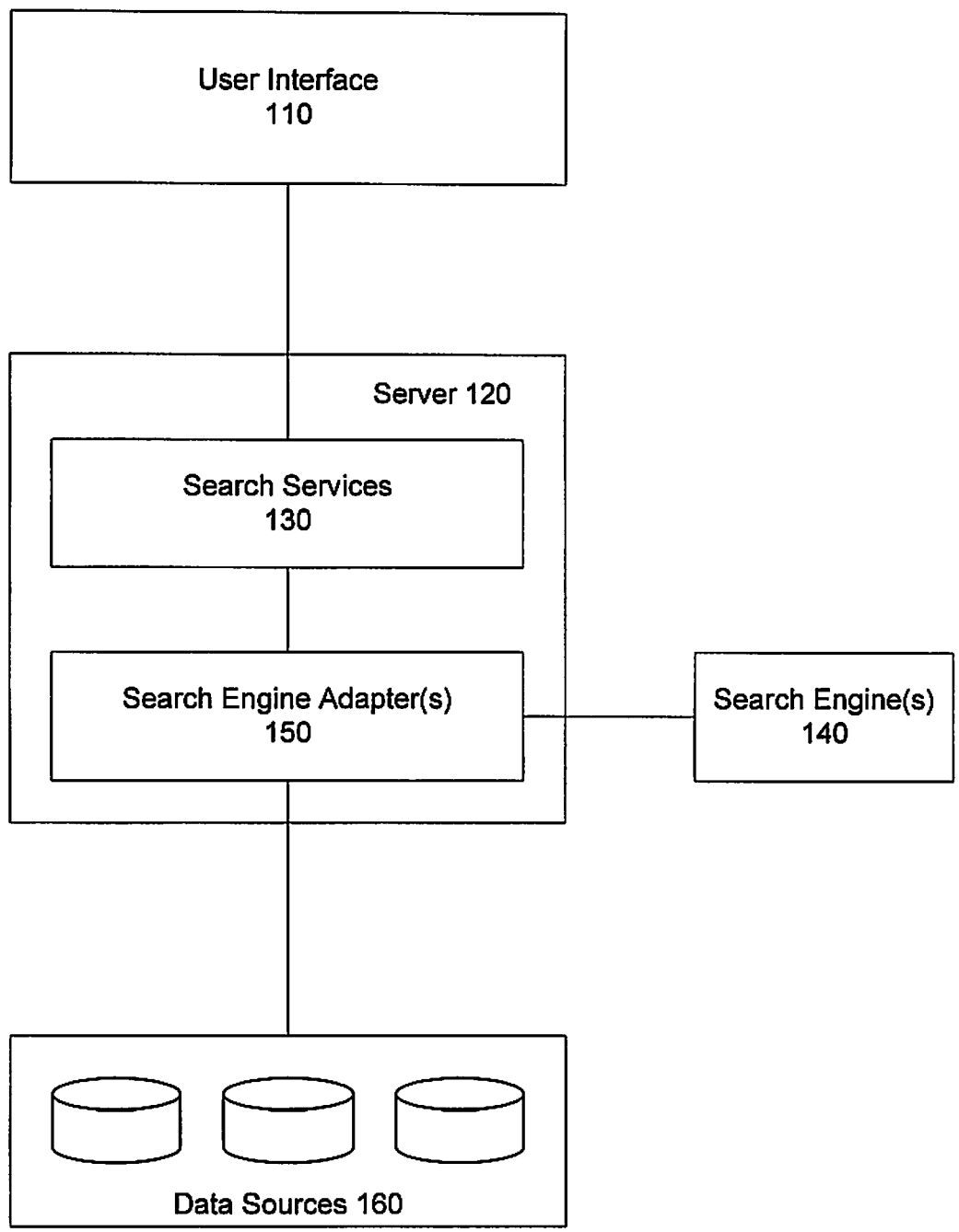
FIG. 1 is a simplified block diagram of an example of a search center architecture incorporating embodiments of the present invention.

FIG. 1 is a simplified block diagram of an example of a search center architecture incorporating embodiments of the present invention. User interface 110 can provide user access to search services provided by server 120. User interface 110 can be a graphical user interface having configureable components, such as menus and drop down selection boxes, suggested by elements provided by server 120. Server 120 can provide not only access to search functionality, but also direct data access, data modification, as well as an ability to sort results provided by searches. Search services component 130 of server 120 provides a variety of search functionality to user interface 110 through a communication interface provided by server 120. Such a communication interface can include, for example, HTML-based web pages, applets, and remote procedure call (RPC) communication links. Search services provided by search services module 130 correspond to search functionality available through search engine 140. Search engine 140 can either be co-located on the same computing system as server 120 or be located on a separate system configured specifically to perform searches.

One or more search engine adapters 150 can be provided within server 120 to allow communication between server 120 and a search engine 140. In addition, a variety of search engine adapters 150 can be provided to allow access to a variety of different search engines 140 that can be configured to perform searches on different types of searchable objects. For a given search engine 140, there can be different kinds of associated search engine adapters based upon function of the search engine adapter. For example, an index adapter provides for creation of search indexes, while a search adapter provides for search execution, or a security adapter provides for search security. The types of search engine adapters available are dependant upon the associated search engine. Different search engines 140 may require different associated search engine adapters, and each search engine adapter 150 is associated with a specific search engine 140. Thus, server 120 can provide access to searchable data located within a heterogeneous set of searchable objects provided by a variety of vendors. Data sources 160 corresponding to the searchable objects can include databases, file systems, portals, electronic mails, and other network accessible data sources.

The search center architecture illustrated in FIG. 1 can provide a variety of types of searches. Examples of searches include keyword searches, full text searches, single item/multiple item searches, Boolean expression searches, and synonym searches. In addition, the search center architecture in FIG. 1 can provide for sorting results of searches and refining searches through various functionalities provided by server 120. Provision of the various functionalities can also result in different user interface screens being provided to a user throughout a session.

A search engine search adapter 150 is configured, in part, through the use of a field mapping. By referencing the field mapping, the search engine search adapter can provide the search services module with information related to the searchable fields available to the user for display on the user interface. A search index can be built by providing a mapping between the searchable fields listed in the search index and related fields found within the searchable objects of interest. Embodiments of the present invention provide such a mapping through the use of a modifiable field mapping file. The field mapping file provides information necessary to make a linkage between fields of the search index and fields of a variety of searchable objects. A user can be provided with the ability to modify the field mappings file, and if such a modification is performed then the search index can be modified at runtime to provide access to or deny access to fields affected by such a modification of the field mappings file.

In general, a search index contains entries, each of which maps a keyword to one or more identifiers that identify data objects that contain one or more instances of the keyword. A search index may also include additional information such as the frequency (i.e., the number of instances) of each keyword in the data objects or the positions of the keyword in data objects. The search services module uses a search index to identify one or more searchable objects that contain one or more keywords identified in a search query. Once identified, the server 120 can sort the identified data objects according to relevance using, for example, keyword position and/or keyword frequency. The sorted data objects are then presented to the user in a search results list. Placing the most relevant data objects first in the search result list, along with content snippets thereof, reduces the time required by users to determine whether one or more of the identified data objects are sufficiently similar to the query.

In addition to providing data used in generation of search indexes, the field mapping file can also provide information used in rendering the user interface 110 (e.g., drop-down boxes).

Figure 2:
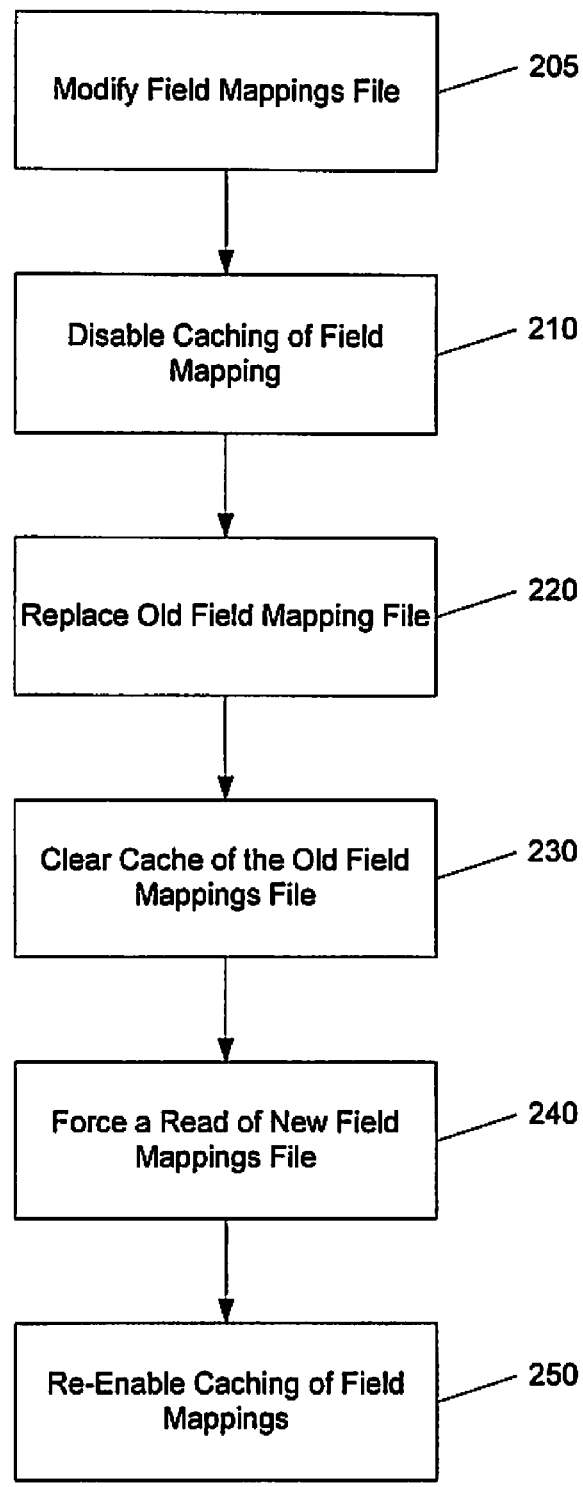
FIG. 2 is a simplified flow diagram illustrating a procedure that can be performed by a user to create a new search index corresponding to a modified field mapping file in accord with embodiments of the present invention.

FIG. 2 is a simplified flow diagram illustrating a procedure that can be performed by a user to create a new search index corresponding to a modified field mapping file. A user will typically have cached a field mapping file in order to enable the use of the same field mapping from session-to-session. Thus, initially, a user who wishes to use a modified field mapping file (205) disables caching of field mapping (210), thereby requiring the server to read the field mapping file upon the next access. The user then replaces the old field mapping file with the new version of the field mapping file (220) or points the system to the location of the new field mapping file. The user then ensures that the system clears the cache of the old field mappings file by logging out and logging back onto the system (230). The user can then access the search services to force the system to read the new field mapping file, thus defining a new set of index settings which can be used by a search engine adapter to generate a new search index complying with the modified field mappings file (240). A user can then re-enable caching of the field mappings file to ensure that a search index representative of the modified field mappings file is available for subsequent access (250).

It should be understood that the set of steps illustrated in FIG. 2 are an example of a mechanism for forcing the search services to generate a new search index in light of a revised field mappings file. However, a variety of different methods can be performed to force use of a new search index settings and mappings and these are contemplated by embodiments of the present invention.

As discussed above, a field mappings file, in accord with embodiments of the present invention, provides a relationship between fields of interest of a variety of searchable objects and searchable fields accessible by a search center through search index settings. This mapping of fields can include, for example, the name of a searchable object within which the field of interest can be found, the name of the field of interest within the searchable object, a location or some other way to access the searchable object (e.g., a URL), and a corresponding name for the field within the search index.

A variety of different file types and configurations can be used to provide a field mappings file. One example of a file structure that can be used when providing a field mappings file is an extensible markup language (XML) formatted file. Use of an XML-formatted field mappings file permits an organization to flexibly structure the configuration of the field mappings file to suit the needs of the enterprise as well as unique requirements of the searchable objects found within the enterprise. Such structure can be provided by an XML document type definition (DTD) file that defines the XML document structure with a list of legal elements.

FIGS. 3A and 3B are an example of an XML DTD file usable by embodiments of the present invention. The DTD file of FIGS. 3A and 3B defines elements found within a searchable object. The DTD file of FIGS. 3A and 3B contemplates a Searchable Object having a SearchCategory element and a LogicalCollection element. Attributes of the SearchCategory element include the actual name of the business component or searchable object (bc-name), a display name of the SearchCategory to be provided to the user interface (ui-name), and ontological name for the SearchCategory, which is a generic name for the SearchCategory (on-name), and a location of the searchable object (URL). Those required attributes allow for locating the SearchCategory of interest within the searchable object. In addition, attributes related to a parent SearchCategory for a present SearchCategory (parent), a "foreign key field" which connects the current SearchCategory with its parent (fkey-field), a ranking booster for the SearchCategory (weight), and a sequence number for sorting SearchCategories on the user interface, if needed (seq no). It should be noted that such attributes for a SearchCategory are provided as an example, and within the spirit of the present invention such attributes can be added to, subtracted from or modified entirely.

As stated above, the SearchCategory element has child elements of fields and links. The field element has attributes providing the field name as it appears in the business component definition (bc-name), and a corresponding index field name, which is used in the search index (in-name). FIGS. 3A and 3B provide a variety of additional attributes for the field element including, for example: a name string for display purposes on the user interface (ui-name), an ontological name for the field (on-name), flags identifying whether the field is searchable, navigable, calculated, stored on the search engine, or if the field is a record identifier. Further, if a field is identified as a calculated field, a formula for calculating the calculated field can be provided as an attribute of the field. In addition, a weight can be provided to the field should that be desired to aid in boosting a ranking of the field when performing a search and an identification of the type of data provided by the field can also be included as an attribute of the field.

The example field mapping DTD illustrated in FIGS. 3A and 3B also provides that a searchable object can have a LogicalCollection as a child element. A LogicalCollection is a group of related SearchCategories.

The example field mapping DTD of FIGS. 3A and 3B further provides for a link child element of a SearchCategory. Links can relate fields within multiple SearchCategories of different searchable objects.

As stated above, the DTD file illustrated in FIGS. 3A and 3B is an example of a structure definition file usable by embodiments of the present invention. The extensible nature of the present invention contemplates that a variety of structure definition files can be used depending upon the nature of data to be accessed by an enterprise's search center through the corresponding search engines. Each DTD file is specific to a particular search engine and keyed to the searchable data corresponding to that search engine. Sufficient information needs to be provided to allow for identification of particular fields of interest within selected searchable objects and an identification of a corresponding field within the search index. However, other flags or other types of data related to those fields can be provided for through the use of a structure definition file such as the illustrated XML DTD. The XML DTD could be included within each field mappings file, per standard XML practice, but the use of a single XML DTD file for an enterprise or a business unit within an enterprise will allow for consistent formulation of field mappings within that organization.

FIGS. 4A and 4B are an example of a field mappings file usable by embodiments of the present invention. As illustrated, the field mappings file of FIGS. 4A and 4B is an XML-formatted file utilizing the definitions provided by the XML DTD file illustrated in FIGS. 3A and 3B. Again, it should be noted that use of XML-formatted documents in FIGS. 3A, 3B, 4A and 4B is provided as an example of a flexible-format structure for field mappings. Embodiments of the present invention are not restricted to those of XML-formatted field mappings files.

The field mappings file illustrated in FIGS. 4A and 4B provides for definition of a field mapping of an "account" searchable object and a variety of fields found within the "account" searchable object. For example, a field called "BC-Name" is an identified searchable field and is associated with search index name "sblbctype." Similarly, a field within the "account" searchable object entitled "last name" is associated with a search index field named "lastName."

Through an examination of the field mappings file illustrated by FIGS. 4A and 4B, it should be readily apparent that reducing or extending the available searchable fields is merely a matter of modifying the entries found within the field mappings file. Should a searchable object itself be modified by a business unit overseeing that business object, and that modification provide desired search fields, then the field mappings file can be modified to include those additional search fields.

The use of the field mappings file thus provides an abstraction layer between the searchable objects themselves and users wishing to perform searches upon information in those searchable objects. Modifications to the searchable objects can be made while providing a consistent set of search fields to users of the system. Further, modifications can be made to increase or decrease the number of available searchable fields without a corresponding need for modifying the business components themselves. This abstraction layer provides a disconnection between modifications to the searchable objects and modifications to the search functionality. This disconnection allows for individual business units to make modifications to searchable objects of importance to their area. Such modifications should, of course, be made keeping in mind the provision of legacy data so that searches occurring using previously existing search indexes and their related field mappings file can continue to be performed. Further, the abstraction layer provided by embodiments of the present invention also permits a logical extensibility of the search objects, by permitting a session-by-session, or need-by-need, modification in the number or definitions of searchable fields for a particular search object, with minimal impact upon the system since such modifications are realized at runtime.

Due to the flexible format of the field mappings file, the relationships provided by the field mappings file are easily applied to a variety of data sources. The field mappings file is not tied to a particular database or a particular file structure. Further, the field mappings file enables support for user-defined searchable objects-based search categories, as well as logically grouping these search categories in any order of a user's choice. The same field mappings can be used in conjunction with various search engines that may differ in structure and definition thereby providing flexibility and portability among those various search engines (and searchable objects).

An Example Computing And Network Environment

As shown above, the present invention can be implemented using a variety of computer systems and networks. An example of one such computing and network environment is described below with reference to FIGS. 5 and 6.

Figure 5:
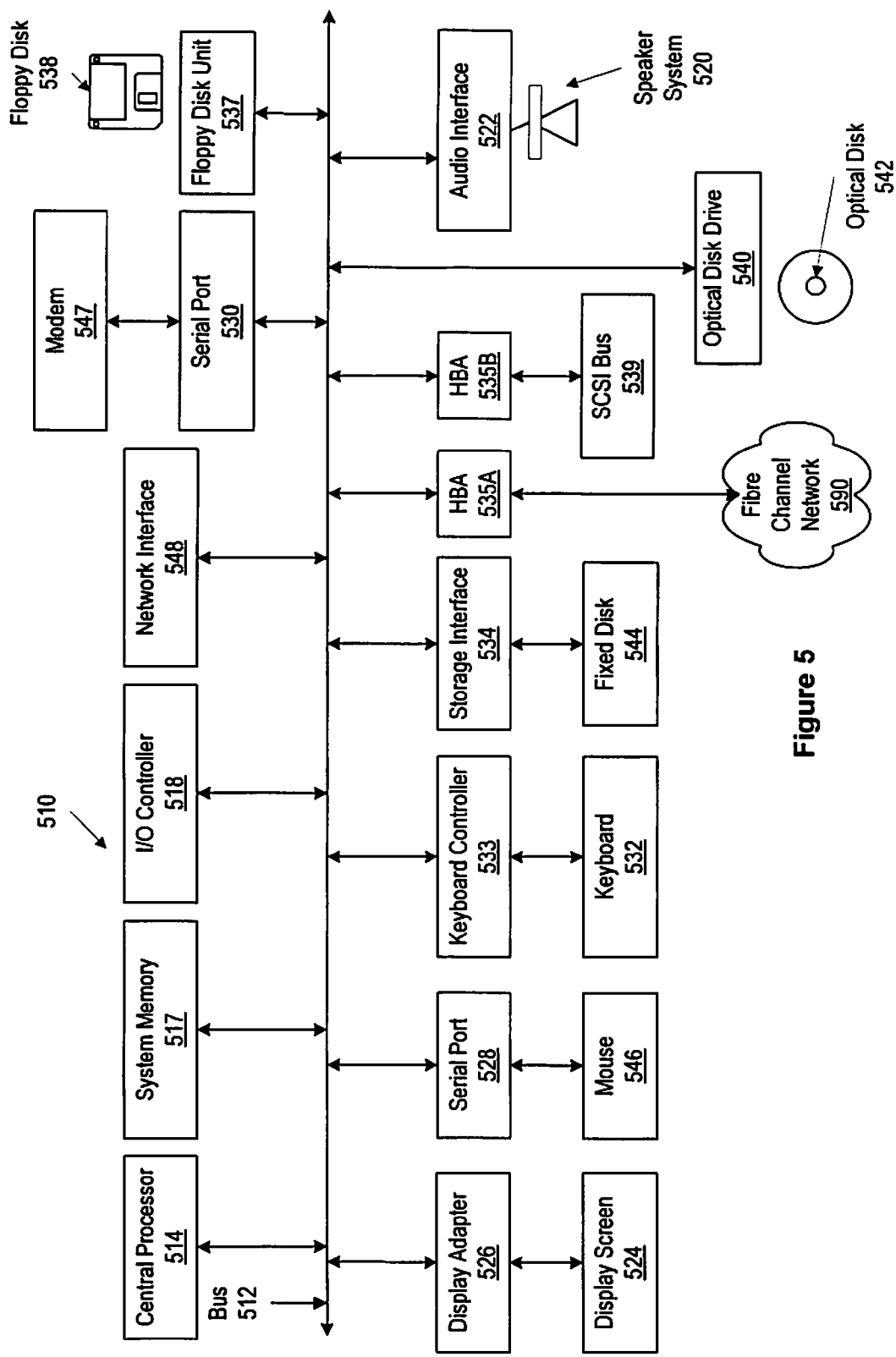
FIG. 5 illustrates a block diagram of a computer system suitable for implementing embodiments of the present invention.

FIG. 5 depicts a block diagram of a computer system 510 suitable for implementing the present invention. Computer system 510 includes a bus 512 which interconnects major subsystems of computer system 510, such as a central processor 514, a system memory 517 (typically RAM, but which may also include ROM, flash RAM, or the like), an input/output controller 518, an external audio device, such as a speaker system 520 via an audio output interface 522, an external device, such as a display screen 524 via display adapter 526, serial ports 528 and 530, a keyboard 532 (interfaced with a keyboard controller 533), a storage interface 534, a floppy disk drive 537 operative to receive a floppy disk 538, a host bus adapter (HBA) interface card 535A operative to connect with a fibre channel network 590, a host bus adapter (HBA) interface card 535B operative to connect to a SCSI bus 539, and an optical disk drive 540 operative to receive an optical disk 542. Also included are a mouse 546 (or other point-and-click device, coupled to bus 512 via serial port 528), a modem 547 (coupled to bus 512 via serial port 530), and a network interface 548 (coupled directly to bus 512).

Bus 512 allows data communication between central processor 514 and system memory 517, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with computer system 510 are generally stored on and accessed via a computer readable medium, such as a hard disk drive (e.g., fixed disk 544), an optical drive (e.g., optical drive 540), a floppy disk unit 537, or other storage medium.

Storage interface 534, as with the other storage interfaces of computer system 510, can connect to a standard computer readable medium for storage and/or retrieval of information, such as a fixed disk drive 544. Fixed disk drive 544 may be a part of computer system 510 or may be separate and accessed through other interface systems. Modem 547 may provide a direct connection to a remote server via a telephone link or to the Internet via an Internet service provider (ISP). Network interface 548 may provide a direct connection to a remote server via a direct network link to the Internet via a POP (point of presence). Network interface 548 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., bar code readers, document scanners, digital cameras and so on). Conversely, all of the devices shown in FIG. 5 need not be present to practice the present invention. The devices and subsystems can be interconnected in different ways from that shown in FIG. 5. The operation of a computer system such as that shown in FIG. 5 is readily known in the art and is not discussed in detail in this application. Code to implement the present invention can be stored in computer-readable storage media such as one or more of system memory 517, fixed disk 544, optical disk 542, or floppy disk 538. Additionally, computer system 510 can be any kind of computing device using an operating system that provides necessary data access features and capabilities.

Figure 6:
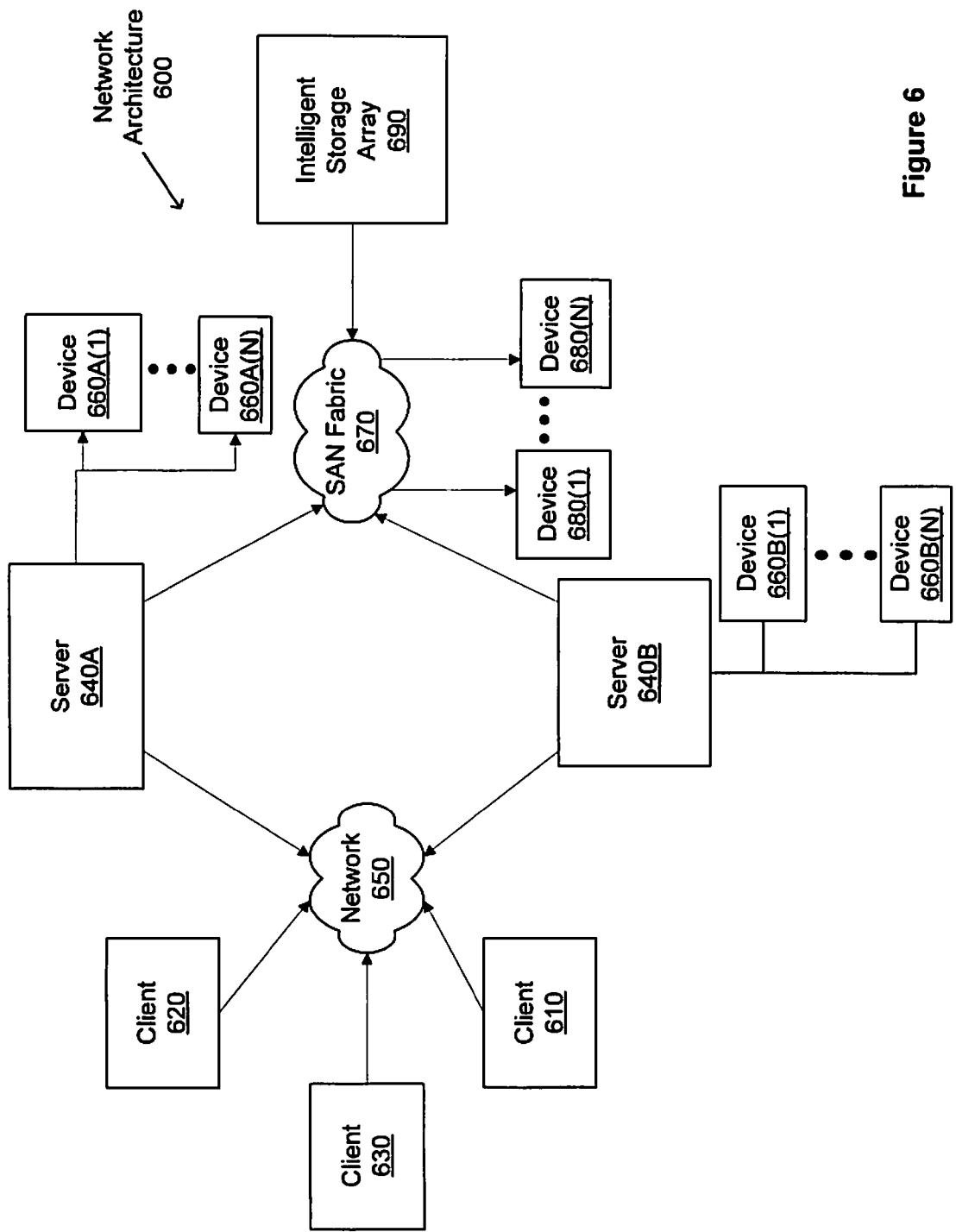
FIG. 6 is a block diagram depicting a network architecture suitable for implementing embodiments of the present invention.

FIG. 6 is a block diagram depicting a network architecture 600 in which client systems 610, 620 and 630, as well as storage servers 640A and 640B (any of which can be implemented using computer system 510), are coupled to a network 650. Storage server 640A is further depicted as having storage devices 660A(1)-(N) directly attached, and storage server 640B is depicted with storage devices 660B(1)-(N) directly attached. Storage servers 640A and 640B are also connected to a SAN fabric 670, although connection to a storage area network is not required for operation of the invention. SAN fabric 670 supports access to storage devices 680(1)-(N) by storage servers 640A and 640B, and so by client systems 610, 620 and 630 via network 650. Intelligent storage array 690 is also shown as an example of a specific storage device accessible via SAN fabric 670.

With reference to computer system 510, modem 547, network interface 548 or some other method can be used to provide connectivity from each of client computer systems 610, 620 and 630 to network 650. Client systems 610, 620 and 630 are able to access information on storage server 640A or 640B using, for example, a web browser or other client software (not shown). Such a client allows client systems 610, 620 and 630 to access data hosted by storage server 640A or 640B or one of storage devices 660A(1)-(N), 660B(1) (N), 680(1)-(N) or intelligent storage array 690. FIG. 6 depicts the use of a TCP/IP network for exchanging data, but the present invention is not limited to any particular network-based environment.

OTHER EMBODIMENTS

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

The foregoing describes embodiments including components contained within other components (e.g., the various elements shown as components of computer system 610). Such architectures are merely examples, and, in fact, many other architectures can be implemented which achieve the same functionality. In an abstract but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected," or "operably coupled," to each other to achieve the desired functionality.

The foregoing detailed description has set forth various embodiments of the present invention via the use of block diagrams, flowcharts, and examples. It will be understood by those within the art that each block diagram component, flowchart step, operation and/or component illustrated by the use of examples can be implemented, individually and/or collectively, by a wide range of hardware, software, firmware, or any combination thereof.

The present invention has been described in the context of fully functional computer systems; however, those skilled in the art will appreciate that the present invention is capable of being distributed as a program product in a variety of forms, and that the present invention applies equally regardless of the particular type of signal bearing media used to actually carry out the distribution. Examples of signal bearing media include recordable media such as floppy disks and CD-ROM, transmission type media such as digital and analog communications links, as well as media storage and distribution systems developed in the future.

The above-discussed embodiments can be implemented by software modules that perform certain tasks. The software modules discussed herein may include script, batch, or other executable files. The software modules may be stored on a machine-readable or computer-readable storage medium such as a disk drive. Storage devices used for storing software modules in accordance with an embodiment of the invention may be magnetic floppy disks, hard disks, or optical discs such as CD-ROMs or CD-Rs, for example. A storage device used for storing firmware or hardware modules in accordance with an embodiment of the invention can also include a semiconductor-based memory, which may be permanently, removably or remotely coupled to a microprocessor/memory system. Thus, the modules can be stored within a computer system memory to configure the computer system to perform the functions of the module. Other new and various types of computer-readable storage media may be used to store the modules discussed herein.

The above description is intended to be illustrative of the invention and should not be taken to be limiting. Other embodiments within the scope of the present invention are possible. Those skilled in the art will readily implement the steps necessary to provide the structures and the methods disclosed herein, and will understand that the process parameters and sequence of steps are given by way of example only and can be varied to achieve the desired structure as well as modifications that are within the scope of the invention. Variations and modifications of the embodiments disclosed herein can be made based on the description set forth herein, without departing from the scope of the invention.

Consequently, the invention is intended to be limited only by the scope of the appended claims, giving full cognizance to equivalents in all respects.

What is claimed is:

1. A method comprising:
providing access to a plurality of searchable objects, wherein each searchable object comprises a plurality of fields of data;
generating a search index comprising searchable fields, wherein
the generating comprises
mapping a first searchable field among the searchable fields to a first field of a first searchable object, and to
a first field of a second searchable object, and
mapping a second searchable field among the searchable fields to
a second field of the first searchable object, and to
a second field of the second searchable object, and
the second searchable object is different from the first searchable object,
the mapping the first searchable field is defined by a field mappings file,
the mapping the second searchable field is defined by the field mappings file,
the field mappings file comprises information identifying at least one searchable object and at least one index field, and
the generating is performed at a time of a search;
modifying the field mappings file, wherein
the modifying the field mappings file is performed by at least one computer processor; and
generating a modified search index, wherein the generating the modified search index comprises
modifying one or more search index settings based at least in part on modified fields of the field mappings file.

2. The method of claim 1, wherein the modifying the field mappings file results in the generating the modified search index.

3. The method of claim 2 wherein the modifying the field mappings file comprises one or more of adding a first searchable object, removing a second searchable object, adding an index field correlated to a field in a third searchable object, and removing an index field.

4. The method of claim 1 further comprising:
formatting the field mappings file using a definitional file, wherein
the definitional file defines variables and structures comprising the field mappings file.

5. The method of claim 4, wherein
the field mappings file is an XML file, and
the definitional file is an XML DTD file.

6. The method of claim 4 wherein the field mappings file comprises the definitional file.

7. The method of claim 1 further comprising:
caching the field mappings file to preserve the searchable fields for a subsequent session.

8. The method of claim 7 further comprising:
caching the modified field mappings file in place of an original field mappings file, in response to the modifying the field mappings file.

9. The method of claim 1, wherein the mapping the first searchable field comprises:
mapping an index field name of the search index to a first object field name of the first searchable object; and
mapping the index field name of the search index to a first object field name of the second searchable object.

10. The method of claim 1, wherein the mapping the first searchable field comprises:
mapping an index field name of the search index to
a name of the first searchable object, and to
a first object field name of the first searchable object; and
mapping the index field name of the search index to
a name of the second searchable object, and to
a first object field name of the second searchable object.

11. The method of claim 1, wherein the generating is performed in response to a modification of the first searchable object.

12. The method of claim 1, wherein the generating is performed in response to a modification of a search functionality of the search index.

13. A system comprising:
an interface configured to provide access to one or more storage devices, wherein
each storage device stores one or more of a plurality of searchable objects, and
each searchable object comprises a plurality of fields of data; and
a processor, coupled to the interface, wherein
the processor is configured for generating a search index comprising searchable fields, wherein the generating comprises mapping a first searchable field among the searchable fields to
a first field of a first searchable object, and to
a first field of a second searchable object, and
mapping a second searchable field among the searchable fields to
a second field of the first searchable object, and to
a second field of the second searchable object, and
the second searchable object is different from the first searchable object,
the mapping the first searchable field is defined by a field mappings file,
the mapping the second searchable field is defined by the field mappings file,
the field mappings file comprises information identifying at least one searchable object and at least one index field, and
the generating is performed at a time of a search;
the processor is configured for modifying the field mappings file; and
the processor is configured for generating a modified search index, wherein the generating the modified search index comprises modifying one or more search index settings based at least in
part on modified fields of the field mappings file.

14. The system of claim 13 wherein the processor is further configured to:
generate the modified search index in response to the modifying the field mappings file.

15. The system of claim 13 wherein the processor is further configured to:
format the field mappings file using a definitional file, wherein
the definitional file defines variables and structures comprising the field mappings file.

16. The system of claim 13 wherein the processor is further configured to:
cache the field mappings file to preserve the searchable fields for a subsequent session.

17. The system of claim 16 wherein the processor is further configured to:
cache the modified field mappings file in place of an original field mappings file, in response to the modifying the field mappings file.

18. A computer-readable storage medium comprising:
a first set of instructions, executable by a processor, configured to provide access to a plurality of searchable objects, wherein each searchable object comprises a plurality of fields of data; and
a second set of instructions, executable by the processor, configured for generating a search index comprising searchable fields, wherein
the second set of instructions further comprises a third set of instructions, executable by the processor, configured for
mapping a first searchable field among the searchable fields to
a first field of a first searchable object, and to
a first field of a second searchable object, and
mapping a second searchable field among the searchable fields to
a second field of the first searchable object, and to
a second field of the second searchable object, and
the second searchable object is different from the first searchable object,
the mapping the first searchable field is defined by a field mappings file,
the mapping the second searchable field is defined by the field mappings file,
the field mappings file comprises information identifying at least one searchable object and at least one index field, and
the second set of instructions are performed at a time of a search;
a fourth set of instructions, configured for modifying the field mappings file; and
instructions for generating a modified search index, comprising
instructions for modifying one or more search index settings based at least in part on modified fields of the field mappings file.

19. The computer-readable storage medium of claim 18 wherein, the modifying the field mappings file results in generating a modified search index.

20. The computer-readable storage medium of claim 18 further comprising:
a fourth set of instructions, executable by the processor, configured to format the field mappings file using a definitional file, wherein
the definitional file defines variables and structures comprising the field mappings file.

21. The computer readable storage medium of claim 18 further comprising:
a fourth set of instructions, executable by the processor, configured to cache the field mappings file to preserve the searchable fields for a subsequent session.

22. The computer readable storage medium of claim 21 further comprising:
a fifth set of instructions, executable by the processor, configured to cache the modified field mappings file in place of an original field mappings file, in response to the modifying the field mappings file.

* * * * *

UNITED STATES PATENT AND TRADEMARK OFFICE
CERTIFICATE OF CORRECTION

PATENT NO.          : 7,979,474 B2
APPLICATION NO.     : 11/875373
DATED               : July 12, 2011
INVENTOR(S)         : Gutlapalli et al.

It is certified that error appears in the above-identified patent and that said Letters Patent is hereby corrected as shown below:

In column 2, line 50, delete "configureable" and insert -- configurable --, therefor.

Signed and Sealed this
Fifteenth Day of November, 2011

David J. Kappos
*Director of the United States Patent and Trademark Office*